(No Model.)
A. H. PRATT.
PROCESS OF TREATING NUTS.
No. 407,684. Patented July 23, 1889.
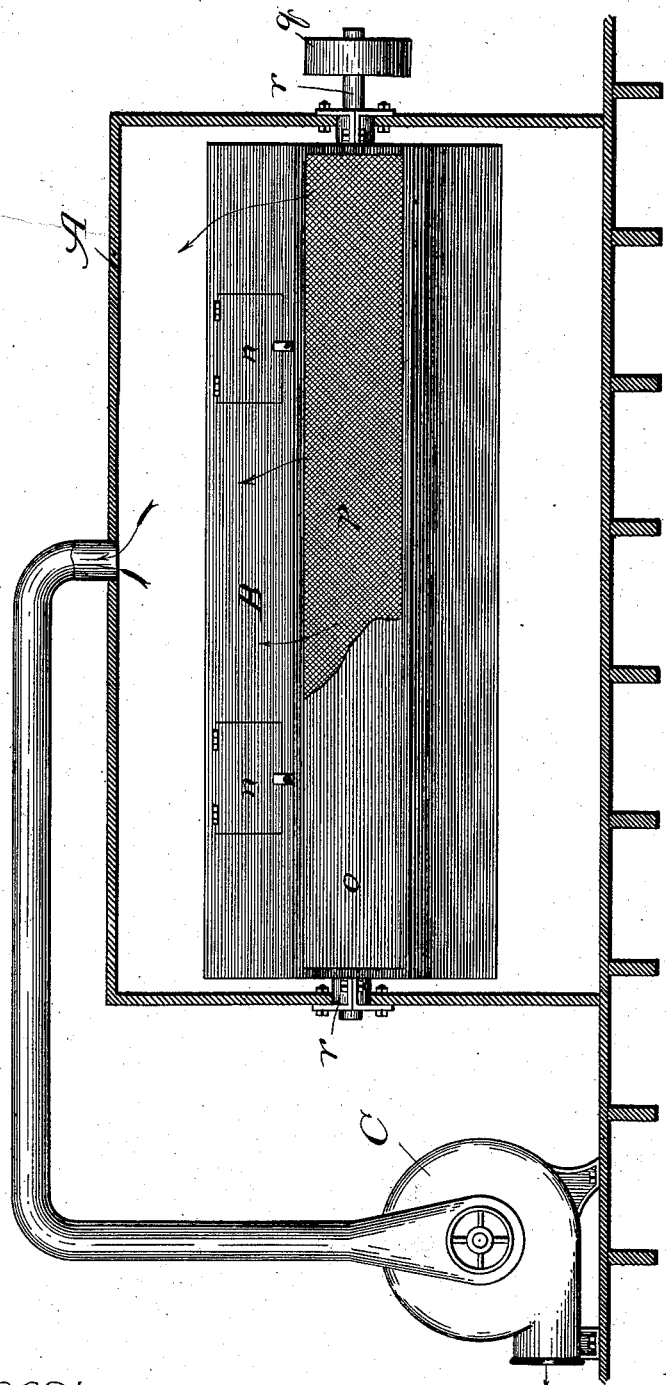
Witnesses:
Inventor:
Albert H. Pratt,
By Dyrenforth & Dyrenforth,
Attys

UNITED STATES PATENT OFFICE.

ALBERT H. PRATT, OF CHICAGO, ILLINOIS.

PROCESS OF TREATING NUTS.

SPECIFICATION forming part of Letters Patent No. 407,684, dated July 23, 1889.

Application filed March 21, 1889. Serial No. 304,169. (No specimens.)

*To all whom it may concern:*

Be it known that I, ALBERT H. PRATT, a citizen of the United States, residing at Chicago, in the county of Cook and State of Illinois, have invented a new and useful Improvement in the Process of Treating Nuts, of which the following is a specification.

Nuts as they are shipped from the source of their supply to dealers are commonly so unclean on the surfaces of their shells and frequently are mixed in the packages containing them with so much refuse matter that cleaning is necessary to render them marketable. Some species of nuts, as the pecan-nut in particular, are rendered the more marketable by coloring or by coloring and polishing the surfaces of their shells, thus rendering them more appetizing by improving their appearance.

My object is to improve the appearance of nuts and thereby increase their marketableness.

To this end my invention consists in the process I employ in the treatment of nuts.

My improvement is intended for application to nuts of various kinds, and for which my treatment is desirable for the reasons stated. The process, however, remains the same, whatever be the kind of nut upon which it is practiced; but since pecan-nuts are those which I have mostly subjected to my process, and since it is for treatment of these nuts more especially that I have invented the process, I confine the following description of my improvement to its application in the treatment of pecan-nuts.

The mechanism I employ for practicing my improvement comprises an incased tumbling-barrel and a suction-fan connected with it. This mechanism is illustrated in the accompanying drawings, in which—

A denotes a housing adapted to be closed on all sides, and which should be provided with doors to permit access, when desired, to its interior, containing the tumbling-barrel B, supported in horizontal position on journals $r$ at its opposite ends in the sides of the housing, one journal projecting beyond the housing and being provided with a belt-wheel $q$, at which the power is applied to rotate the tumbling-barrel. The housing communicates from its upper side with a suitable suction-fan C. The form of the tumbling-barrel is preferably octagonal, and is provided at intervals with inserted longitudinal screens $p$, which are left uncovered while the tumbling operation is being performed to clean the nuts by removing foreign matter (dirt) from their surfaces, but should be closed by sliding bars or boards $o$ into grooves along their upper and lower edges while the coloring or coloring and polishing is taking place, as hereinafter described.

To prepare the nuts to receive the coloring-matter, they should be clean, and to cleanse them they are introduced through the doors $n$ into the tumbling-barrel, when the doors $n$ and the housing A are closed. The tumbling-barrel is then rotated and the fan set in motion, whereby the dirt on the nuts is removed from them and drawn off by the action of the fan from the interior of the housing, into which it enters through the screens $p$. After the cleaning has been thoroughly performed, the barrel is brought to a standstill, and the screens are covered by sliding the bars or boards $o$ into place over them. Dry pulverized coloring-matter—such as Italian sienna of desired shade, or a mixture thereof of different shades of color, and, if desired, other suitable earthy coloring material or materials mixed with the sienna, the mixture and ingredients depending upon the color to be produced—is introduced in suitable quantity into the tumbling-barrel, which is then again rotated. The result, which is attained ordinarily in from twenty minutes to half an hour, when the motion of the barrel is stopped, is that the nuts are provided with a dull surface coloring. It is desirable that the nuts should then be polished, which I accomplish by introducing powdered soapstone upon them in the barrel and again tumbling them therein for about fifteen minutes, when the nuts are removed and packed, ready for the market. If preferred, the soapstone may be mixed and introduced with the pulverized coloring-matter, whereby the coloring and polishing operations are performed simultaneously and time is saved.

The color most desirable for pecan-nuts ranges from a light mahogany or cherry to a dark mahogany, and may be attained by using a desired shade of pulverized Italian sienna or mixing it with other dry pulverized coloring-matter, such as the substance known as "curcuma" or a chrome color. Other substances than those mentioned can be used for the coloring, depending upon the shade or color desired to be imparted to the nuts. Those stated, however, sufficiently explain my process, and will readily suggest others for use in producing particular shades that may be desired.

What I claim as new, and desire to secure by Letters Patent, is—

1. The process of treating nuts, which consists in tumbling them with dry pulverized coloring material, substantially as described.

2. The process of treating nuts, which consists in tumbling them to cleanse them of dirt on their surfaces, and then coloring them by tumbling them with a dry pulverized coloring material, substantially as described.

3. The process of treating nuts, which consists in tumbling them with a dry pulverized coloring material, thereby imparting color to them, and with powdered soapstone, thereby polishing them, substantially as described.

4. The process of treating nuts, which consists in tumbling them with a dry powdered Italian sienna, thereby imparting color to them, and with powdered soapstone, thereby polishing them, substantially as described.

ALBERT H. PRATT.

In presence of—
J. W. DYRENFORTH,
M. J. BOWERS.